W. H. WYMAN.
OPERATING MECHANISM FOR WASHING MACHINES.
APPLICATION FILED AUG. 12, 1912.

1,110,733.

Patented Sept. 15, 1914.

2 SHEETS—SHEET 1.

Witnesses:

Inventor
William H. Wyman
by Brown & Mekleffer Attys

W. H. WYMAN.
OPERATING MECHANISM FOR WASHING MACHINES.
APPLICATION FILED AUG. 12, 1912.
1,110,733.
Patented Sept. 15, 1914.
2 SHEETS—SHEET 2.
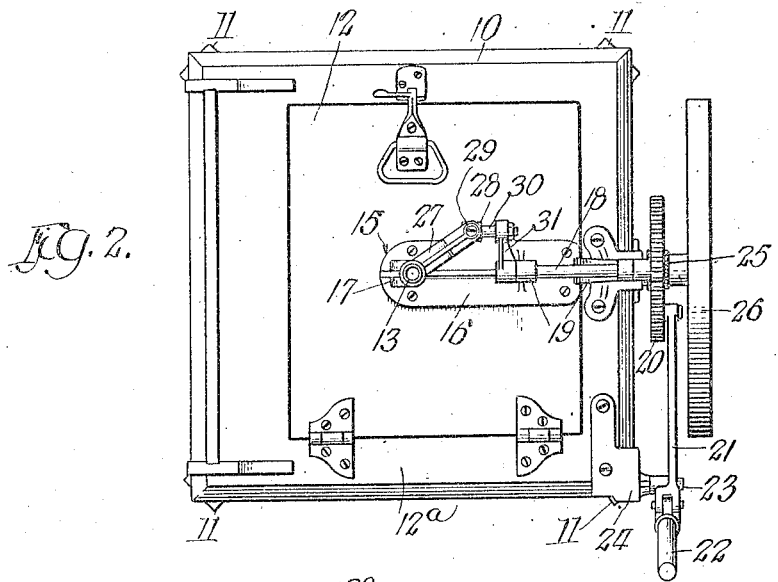
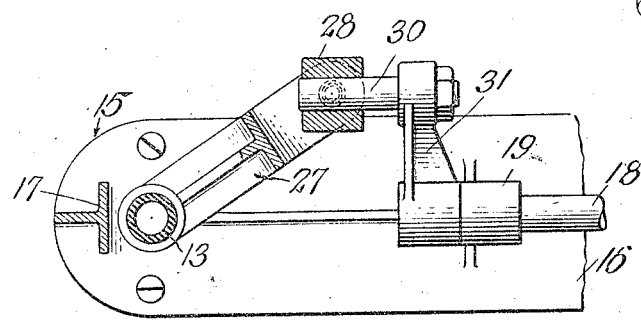 
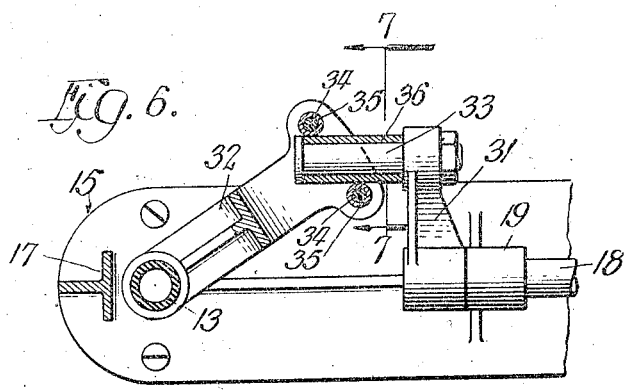 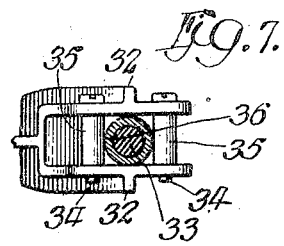
Witnesses:
Inventor
William H. Wyman

UNITED STATES PATENT OFFICE.

WILLIAM H. WYMAN, OF OSHKOSH, WISCONSIN, ASSIGNOR TO JOHN G. SEELIG, OF RIPON, WISCONSIN.

OPERATING MECHANISM FOR WASHING-MACHINES.

1,110,733.   Specification of Letters Patent.   Patented Sept. 15, 1914.

Application filed August 12, 1912. Serial No. 714,592.

*To all whom it may concern:*

Be it known that I, WILLIAM H. WYMAN, a citizen of the United States, and a resident of Oshkosh, in the county of Winnebago and State of Wisconsin, have invented certain new and useful Improvements in Operating Mechanism for Washing-Machines and the like; and I do hereby declare that the following is a full, clear, and exact description thereof, reference being had to the accompanying drawings, and to the letters of reference marked thereon, which form a part of this specification.

This invention relates to improvements in gearing and consists of the matters hereinafter described and more particularly pointed out in the appended claims.

The invention is shown as applied to a washing machine of the kind including a tub and an operating shaft depending into the tub and carrying at its lower end a pounder to which it imparts both a vertical and a rotary reciprocation. My improved gearing is used for the purpose of actuating the said operating shaft.

Figure 1:
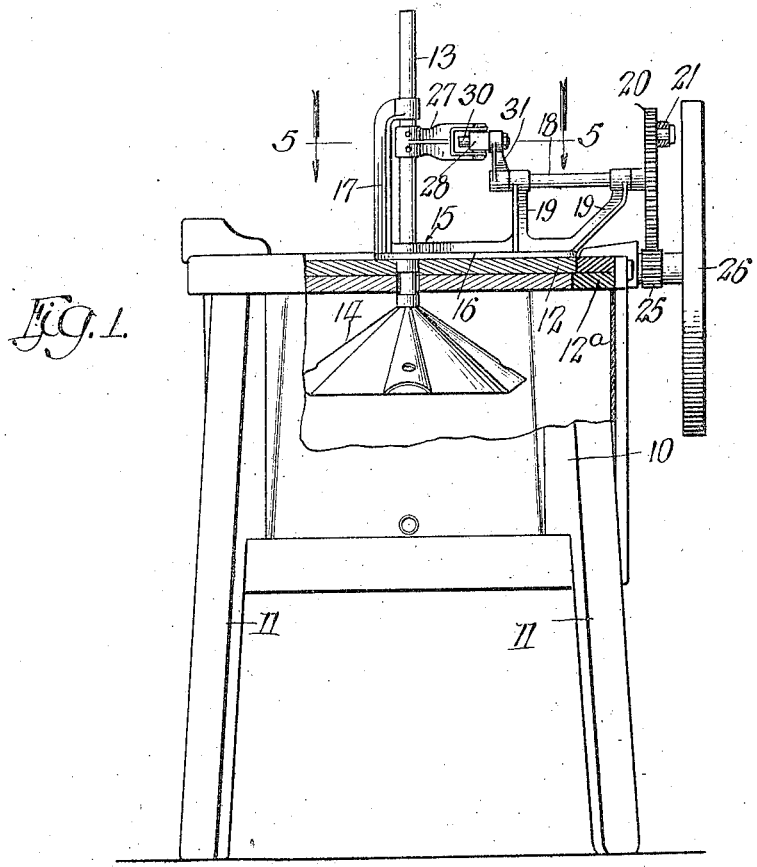
Figure 3:
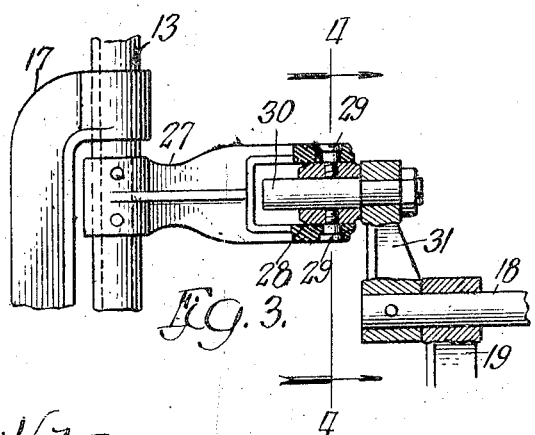
Figure 4:
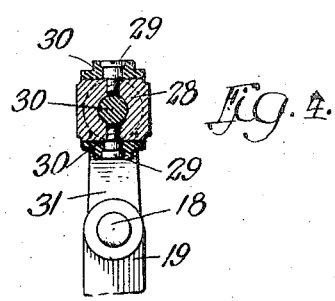

In the drawings:—Figure 1 is a view representing a front elevation of a washing machine of the kind described provided with my improved gearing, the tub being partially shown in vertical section. Fig. 2 is a top plan view of the same. Fig. 3 is a view representing on an enlarged scale a vertical section through a part of the mechanism taken in the plane of the operating shaft. Fig. 4 is a view representing a vertical section through Fig. 3 in the plane indicated by the line 4—4 thereof. Fig. 5 is a view representing on an enlarged scale a horizontal section through Fig. 1 in a plane indicated by the line 5—5 thereof. Fig. 6 is a view similar to Fig. 5, showing a slightly modified form of construction. Fig. 7 is a view representing a vertical section through Fig. 6 in a plane indicated by the line 7—7 thereof.

Referring now to that embodiment of my invention shown in the drawings, particularly in Figs. 1 to 5, inclusive, 10 indicates a support, in this case a washing machine tub having legs 11. Said tub, as shown, is square in cross-section and is provided with a lid 12 which is hinged to the fixed marginal top wall 12ª of said tub. 13 indicates an operating shaft which is capable of both a longitudinal and of a rotary reciprocation and which, in this case, depends vertically through the tub lid 12, and has secured to its lower end a pounder 14 of familiar construction. The shaft 13 is mounted centrally of the tub in a standard 15 consisting of a base-plate 16 attached to the tub lid 12 and of an upright overhanging arm 17. The overhanging part of said arm and the base 16 in vertical alinement below it, are provided with suitable apertures or openings in which the shaft 13 has bearing, so as to be capable of vertical reciprocating movement and rotary reciprocating movement. 18 indicates a shaft located in a plane with the shaft 13 and extending at an angle to said shaft 13. The inner end of the shaft 18 is spaced from the shaft 13. Said shaft 18 is, in this case, horizontal and is mounted in bearings formed in horizontally spaced upright arms 19, 19, which rise from the base-plate 16. The shaft 18 is a continuously rotatable shaft and has secured to its outer end a gear 20 to which is imparted a continuous rotating movement by means of a pitman 21 and of a hand-lever 22 which is fulcrumed on a stud 23 fixed to a plate 24. Said plate 24 is attached to the fixed marginal top wall 12ª of the tub. The said gear 20 meshes, as shown herein, with a pinion 25 fixed to the hub of a fly-wheel 26 which is journaled in any convenient manner at the side of the tub. Thus the gear 20 may be rotated by means of a suitable handle attached to the fly-wheel (not shown) or may be operated as a part of a high-speed mechanism by means of the lever 22,—the oscillation of the lever imparting continuous rotary movement to the gear 20 and to the fly-wheel 26 which acquires momentum and thus facilitates the operation of the mechanism. The means interposed between the continuously rotating actuating member, in this case the shaft 18 and the operating member capable of rotary reciprocation and of reciprocation in a line parallel to its axis of rotary reciprocation, in this case the shaft 13, for transposing the movement of the first into the movement of the second is as follows: 27 indicates an arm fixed to and movable with the shaft 13 located intermediate the bearing openings in the overhanging arm 17 and the base plate 16 and extending toward the shaft 18. 31 indicates a crank-arm fixed to the inner end of the shaft 18. There is interposed between the crank-arm 31 and the arm fixed to the operating shaft 13, operating connecting means including a pin made rigid with the one arm and a device carried by the other arm which provides for relative rotary and longitudinal reciprocatory movement of said pin with reference to said other arm. As shown herein in Figs. 1 to 5, inclusive, the pin is in the form of a crank-pin 30 carried by the crank-arm 31 and the bearing device for the pin is a block 28 bored to receive said crank-pin and rotatively mounted at the end of the arm 27 fixed to the shaft 13. The axis of rotation of said block is vertical and the end of the arm 27 is bifurcated to receive the same. Said block is provided with vertical threaded apertures into which are screwed screws 29 which have shoulders for engagement with the outer faces of said block and have shouldered heads loosely mounted in suitable apertures formed in the bifurcations of the arm 27. The crank-pin 30 has in this case rotative and longitudinally reciprocatory bearing in the block 28. The rotation of the crank-arm 31 imparts an up and down movement to the arm 27 fixed to the operating shaft and also a rotary reciprocatory movement to it and the said arm in turn imparts to the operating shaft 13 at once a vertical reciprocation and a rotary reciprocation. The diameter of the arc described by the crank-pin represents the amount of the vertical reciprocation and also the chord of the arc through which the shaft is rotated.

In Figs. 6 and 7 I have shown a slightly modified construction. In these views 32 indicates the bifurcated arm fixed to the operating shaft, and 33 the crank-pin. 34, 34 indicate horizontally spaced vertical rods secured to and extending between the bifurcations of the arm 33, said rods being spaced apart a sufficient distance to allow for the required movement of the crank-pin in imparting the intended amplitude of oscillation to the arm 32. As shown, the rods 34 are preferably provided with rotative antifriction sleeves 35 and the crank-pin is likewise provided with an antifriction sleeve 36. The operation in this case is the same as in the other case.

My improved gearing is very simple and efficient for the purpose intended and, as will be readily apparent, may be applied to other machines where a similar movement is required.

While in describing my invention I have referred to certain details of construction and arrangement of parts, it is to be understood that my invention is in no way limited thereto except in so far as may be pointed out in the appended claims.

I claim as my invention:—

1. In combination with an operating shaft capable of both vertical and rotary reciprocation, a continuously rotatable, horizontal shaft, in a plane with said operating shaft and having one end spaced therefrom, a crank-arm fixed to that end of the said horizontal shaft, a horizontal crank-pin fixed to said crank arm and extending toward said operating shaft, a horizontal radial arm fixed to said operating shaft and extending toward said horizontal shaft, said arm being bifurcated at its end to provide vertically spaced parallel, horizontally extending bearing surfaces, and means operatively connecting said crank-pin with said arm providing for rotative and horizontal reciprocatory bearing of said crank-pin between said bearing surfaces.

2. In combination with an operating shaft capable of both vertical and rotary reciprocation, a continuously rotatable, horizontal shaft in a plane with said operating shaft and having one end spaced therefrom, a crank-arm fixed to that end of the said horizontal shaft, a horizontal crank-pin fixed to said crank arm and extending toward said operating shaft, a horizontal radial arm fixed to said operating shaft and extending toward said actuating shaft, said arm being bifurcated at its end to provide vertically spaced, parallel, horizontal bearing surfaces, a block having bearing between said bearing surfaces, and means providing vertical journals for said block adapting it for rotary oscillatory movement about a vertical axis, said crank pin having rotative and horizontal reciprocatory bearing in said block.

In testimony, that I, claim the foregoing as my invention I affix my signature in the presence of two witnesses, this eighth day of August A. D. 1912.

WILLIAM H. WYMAN.

Witnesses:
D. H. MORRISON,
W. G. BABCOCK.